United States Patent
Martin Perez et al.

(10) Patent No.: US 9,942,466 B2
(45) Date of Patent: Apr. 10, 2018

(54) TRANSPARENT LENS ELEMENT IN CONVERTIBLE BASE FOR CAMERA CAPTURE PASS-THROUGH

(71) Applicant: GOOGLE INC., Mountain View, CA (US)

(72) Inventors: Alberto Martin Perez, Alos Altos, CA (US); Kan Liu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/193,803

(22) Filed: Jun. 27, 2016

(65) Prior Publication Data
US 2017/0374274 A1    Dec. 28, 2017

(51) Int. Cl.
*H04N 5/232* (2006.01)
*G02B 13/00* (2006.01)
(Continued)

(52) U.S. Cl.
CPC ....... *H04N 5/23216* (2013.01); *G02B 13/009* (2013.01); *G02B 13/0015* (2013.01);
(Continued)

(58) Field of Classification Search
CPC .. G06F 1/1618; G06F 1/1616; H04N 5/23216
See application file for complete search history.

(56) References Cited

U.S. PATENT DOCUMENTS

| 9,066,005 B2 | 6/2015 | Park |
| 2003/0040346 A1* | 2/2003 | Fukuda ................. G06F 1/1616 455/575.1 |

(Continued)

FOREIGN PATENT DOCUMENTS

| EP | 1453305 A1 | 9/2004 |
| EP | 2891941 A1 | 7/2015 |

(Continued)

OTHER PUBLICATIONS

International Search Report and Written Opinion for PCT Application No. PCT/US2016/66847, dated Mar. 10, 2017, 17 pages.

(Continued)

*Primary Examiner* — Christopher K Peterson
(74) *Attorney, Agent, or Firm* — Brake Hughes Bellermann LLP

(57) ABSTRACT

A convertible computer includes a transparent optical element in the keyboard base that provides light pass-through for the camera but does not interfere with the user's experience. The transparent optical element may include a transparent glass or plastic element that maintains the imaging specifications of the rear-facing camera. In some implementations, the transparent optical element can maintain the f-number of the optical system that includes the camera and the transparent optical element and may not affect image quality of images captured by the camera. In some arrangements, the transparent optical element can include an optical system that can increase the light-gathering ability of the camera (e.g., decreases f-number), effectively converting the camera lens into a macro lens. In other arrangements, the transparent optical element can include an optical system that can improve the imaging of distant objects (e.g., increases f-number), effectively converting the camera lens into a telephoto lens.

21 Claims, 10 Drawing Sheets

(51) Int. Cl.
*H04N 5/225* (2006.01)
*G06F 3/0338* (2013.01)
*G06F 3/0362* (2013.01)
*G06F 3/0484* (2013.01)
*G06F 1/16* (2006.01)
*G03B 13/36* (2006.01)

(52) U.S. Cl.
CPC ......... *G02B 13/0075* (2013.01); *G03B 13/36* (2013.01); *G06F 1/1618* (2013.01); *G06F 1/1643* (2013.01); *G06F 1/1686* (2013.01); *G06F 3/0338* (2013.01); *G06F 3/0362* (2013.01); *G06F 3/0484* (2013.01); *H04N 5/2253* (2013.01); *H04N 5/2254* (2013.01); *H04N 5/23245* (2013.01); *H04N 5/23293* (2013.01)

(56) References Cited

U.S. PATENT DOCUMENTS

| | | | |
|---|---|---|---|
| 2004/0116166 A1* | 6/2004 | Makishima | H04M 1/0214 455/575.1 |
| 2008/0008464 A1* | 1/2008 | Schack | G03B 17/17 396/72 |
| 2010/0149402 A1 | 6/2010 | Aoki et al. | |
| 2012/0293936 A1* | 11/2012 | Wu | G06F 1/1624 361/679.4 |
| 2014/0185215 A1 | 7/2014 | Whitt, III et al. | |
| 2015/0103223 A1* | 4/2015 | Park | H04N 5/23212 348/333.12 |

FOREIGN PATENT DOCUMENTS

| | | |
|---|---|---|
| KR | 10-2008-0013267 A | 2/2008 |
| WO | 2004083899 A2 | 9/2004 |
| WO | 2014105182 A1 | 7/2014 |

OTHER PUBLICATIONS

Combined Search and Examination Report for GB Patent Application No. 1621597.2, dated Jun. 6, 2017, 6 pages.

* cited by examiner

800

810

Position a base of a laptop with respect to a monitor of the laptop to transition the laptop to a tablet mode 802

Forming a second camera from a first camera positioned within the monitor and a transparent optical system positioned in the base and aligned with the first camera 804

TRANSPARENT LENS ELEMENT IN CONVERTIBLE BASE FOR CAMERA CAPTURE PASS-THROUGH

TECHNICAL FIELD

This description generally relates to cameras embedded in portable electronic devices.

BRIEF DESCRIPTION OF THE DRAWINGS

Like reference symbols in the various drawings indicate like elements.

DETAILED DESCRIPTION

Conventional convertible computers provide the functions of both a laptop computer and a tablet computer. The laptop computer function, or laptop mode, is optimized for input via a physical keyboard and touchpad/mouse. The tablet computer function, or tablet mode, is optimized for input via a touchscreen monitor with the keyboard deactivated and folded back. In a typical operation, a user may switch from the laptop mode to the tablet mode by rotating a keyboard base about a hinge.

Conventional convertible computers as well as laptop computers and tablet computers typically have a front-facing camera. The front-facing camera of a convertible computer usually has a resolution that is relatively low compared to a resolution of a rear-facing camera included in the convertible computer and provides an image of a user when the convertible computer is in the laptop mode.

Many tablet computers and laptop computers also have a relatively high resolution, rear-facing camera. However, conventional convertible computer lacks a rear-facing camera because such a camera would be obscured by the keyboard base when such a convertible computer is in tablet mode.

In contrast to the conventional convertible computers, an improved convertible computer includes a transparent optical element in the keyboard base that provides light pass-through for the camera but does not interfere with the user's experience in laptop mode. The transparent optical element may include a transparent glass or plastic element that maintains the imaging specifications of the rear-facing camera. In some implementations, the transparent optical element can maintain the f-number of the optical system that includes the camera and the transparent optical element and may not affect image quality of images captured by the camera. In some arrangements, the transparent optical element can include an optical system that can increase the light-gathering ability of the camera (e.g., decreases f-number), effectively converting the camera lens into a macro lens. In other arrangements, the transparent optical element can include an optical system that can improve the imaging of distant objects (e.g., increases f-number), effectively converting the camera lens into a telephoto lens. In some arrangements, the transparent optical element may be provided with an anti-reflection coating to minimize light loss and/or may be aligned with the camera using, e.g., a magnetic device.

Figure 1A:
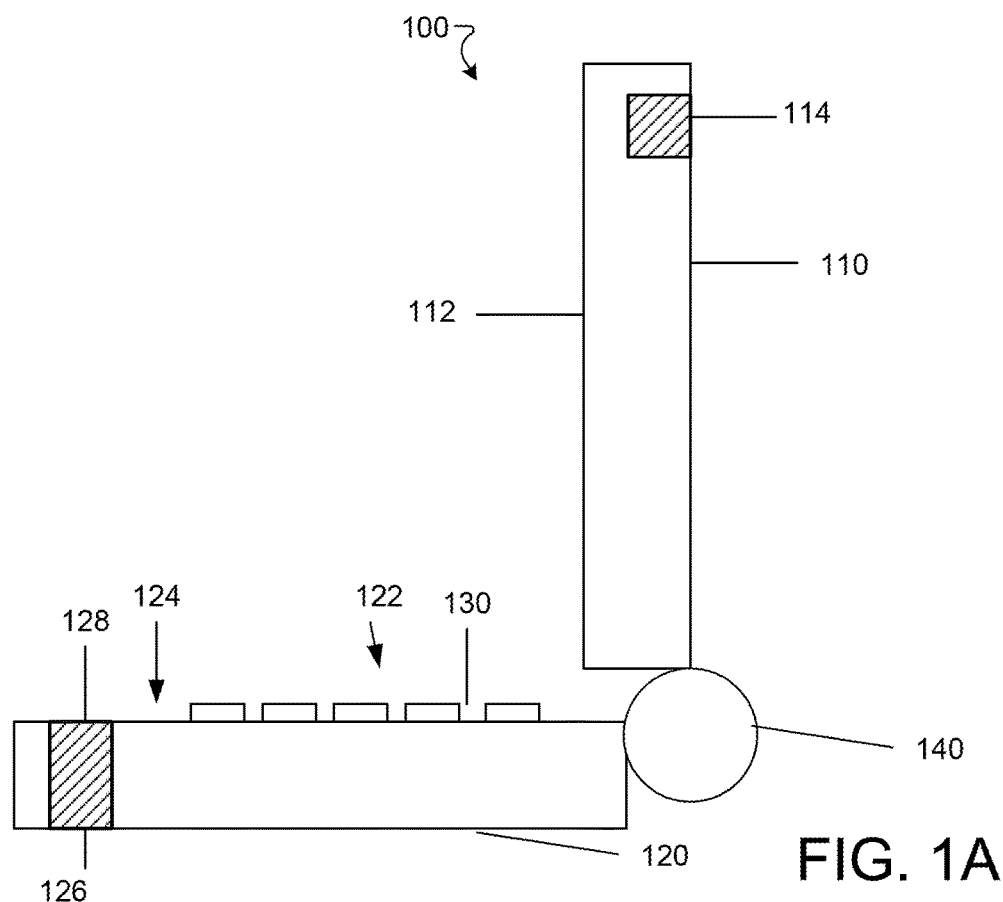
FIG. 1A is a side-view block diagram depicting an example convertible electronic device in a laptop mode according to an improvement described herein.

FIG. 1A is a side-view block diagram depicting an example convertible electronic device 100 in the laptop mode. The convertible electronic device 100 includes a monitor 110, a keyboard base 120, and a hinge 140.

The monitor 110 is configured and arranged to display input and output to a user and to capture images of objects at a distance away from the user. To this effect, the monitor 110 includes a display 112 and a rear-facing camera 114. The rear-facing camera 114 faces away from the display 112.

The display 112 is configured and arranged to display input and output to a user. The display 112 can include a liquid crystal display (LCD) illuminated by light-emitting diodes (LEDs). In some implementations, the display 112 may be illuminated by thin-film transistors (TFTs). The display 112 can have various resolutions, including, for example, 1920×1080 pixels, 1024×768 pixels, 1280×720 pixels, 1366×768 pixels, 2560×1440 pixels, and so on). The display 112 can have various aspect ratios, including, for example, 16:9, 4:3, or 16:10.

The rear-facing camera 114 is configured and arranged to capture images of objects at a distance away from a user. Typically, the rear-facing camera is arranged to form images of objects located relatively far (e.g., more than 20 feet) from the user. However, the rear-facing camera 114 may also provide images of objects at closer conjugates. The rear-facing camera 114 can have a fixed focal length (e.g., about 5 mm, although the focal length may be smaller or larger). Also, a typical f-number of the rear-facing camera 114 (equal to a ratio of the focal length to the width of a clear aperture, i.e., a diameter of an entrance pupil of the rear-facing camera 114) can be 2.4, although larger and smaller values of the f-number may be used.

The keyboard base 120 is configured and arranged to provide the user with the ability to enter input into the convertible electronic device 100 while in laptop mode. The keyboard base 120 is also configured and arranged to provide the user with a space to rest his/her wrists and hands. The keyboard base 120 includes a keyboard area 122 and a base area 124.

In some implementations, the keyboard area 122 can cover roughly the top half of the surface of the keyboard base 120. The keyboard area includes a keyboard 130 used to input textual input into the convertible electronic device 100.

The base area 124 provides a rest area for hands and wrists of a user. Furthermore, the base area as depicted in FIG. 1A also includes a transparent optical system 126. The transparent optical system 126 is configured and arranged to provide the convertible electronic device 100 with a rear-facing camera when in the tablet mode. The transparent optical system may be any optical system that at least preserves the light-gathering and imaging capability of the rear-facing camera 114 when the convertible electronic device 100 is in the laptop mode. The transparent optical system can have an external surface 128 that shown as a flat surface in FIG. 1. When then external surface 128 is smooth and flat, the base area 124 may continue to provide a rest area for the hands and wrists of the user without any annoying bump or divot.

The hinge 140 connects the monitor 110 and the keyboard base 120 and provides a swivel about which the keyboard base 120 may be rotated about the monitor 110. When the keyboard base 120 is rotated toward the display 112, the convertible electronic device 100 is closed and is typically put into a sleep mode. However, then the keyboard base 120 is rotated away from the display 112, at some point (e.g., when an angle between the display 112 and the keyboard 130 is greater than 150 degrees) the convertible electronic device 100 transitions into the tablet mode.

Figure 1B:
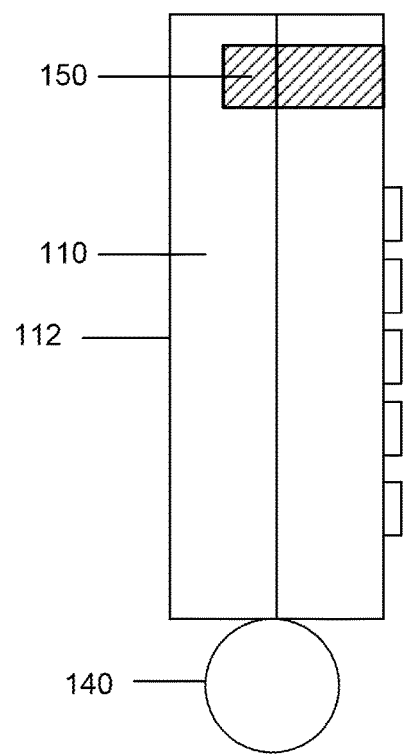
FIG. 1B is a side-view block diagram depicting an example convertible electronic device in a tablet mode according to the improvement described herein.

FIG. 1B is a side-view block diagram depicting the example convertible electronic device 100 in the tablet mode according to the improvement described herein. Here, a backside of the monitor 110 and a backside of the keyboard base are in contact with one another. Furthermore, the transparent optical system 126 becomes located in front of the rear-facing camera 114. When the transparent optical system 126 and the rear-facing camera 114 are aligned (e.g., with a magnetic device), they form a combined camera 150.

In some implementations, the combined camera 150 is configured and arranged to at least preserve the light-gathering and/or imaging capability of the rear-facing camera 114. For example, to preserve light-gathering capability, if the rear-facing camera 114 has an f-number of 2.4, then the combined camera 150 can have an f-number of at most 2.4. However, to make the combined camera 150 act as a telephoto lens, the combined camera may have an f-number larger than 2.4. In one arrangement, the transparent optical system 126 does not have optical power and therefore preserves the light-gathering and imaging capability of the rear-facing camera 114. However, in other arrangements, the transparent optical system 126 has nonzero optical power, such that the transparent optical system 126 may be configured to provide the combined camera 150 with improved the light-gathering and/or image quality over that of the rear-facing camera 114. Examples of such improvements are described with regard to FIGS. 3 and 4.

Figure 2A:
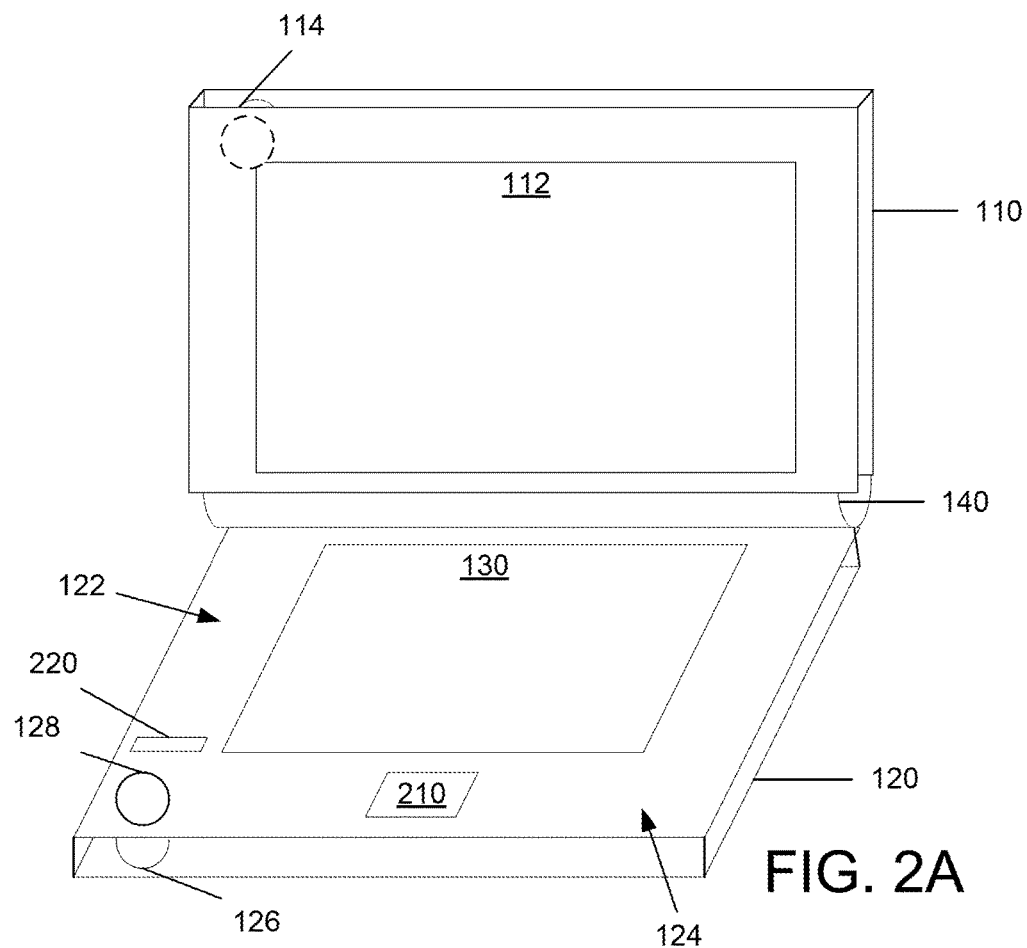
FIG. 2A is a front-view block diagram depicting the example convertible electronic device in the laptop mode according to the improvement.

FIG. 2A is a frontal view of the example convertible electronic device 100 in the laptop mode depicted in a side view in FIG. 1A. Here, another input device, a touchpad 210, may be seen. Furthermore, one may see the position of the transparent optical system 126 within the base area 124. As discussed above, the position of the transparent optical system 126 within the base area 124 is such that the transparent optical system 126 may form the combined camera 150 with the rear-facing camera 114.

Also shown in FIG. 2A is a manual control 220 of the combined camera 150. The manual control 220 allows a user to adjust optical properties of the combined camera 150 by moving a part of the manual control 220. In some arrangements, the manual control 220 may be used to adjust a clear aperture of the combined camera 150. In other arrangements, the manual control 220 may be used to adjust a focus of the combined camera 150. In other arrangements, the manual control 220 may be used to adjust a magnification (e.g., a zoom) of the combined camera 150.

When the manual control 220 is separate from the transparent optical system 126 as shown in FIG. 2A, the external surface 128 of the transparent 126 can be a flat surface flush against the surface of the keyboard base 120. Such a flat surface provides a benefit of maintaining a level of comfort and ergonomic design of the convertible computer system 100 in the laptop mode. However, in some arrangements, the manual control 220 may be placed on top of the transparent optical system 126, i.e., the external surface 128 includes the manual control 220. In that case, the manual control 220 may cause the transparent optical system to protrude from the surface of the keyboard base 120.

Figure 2B:
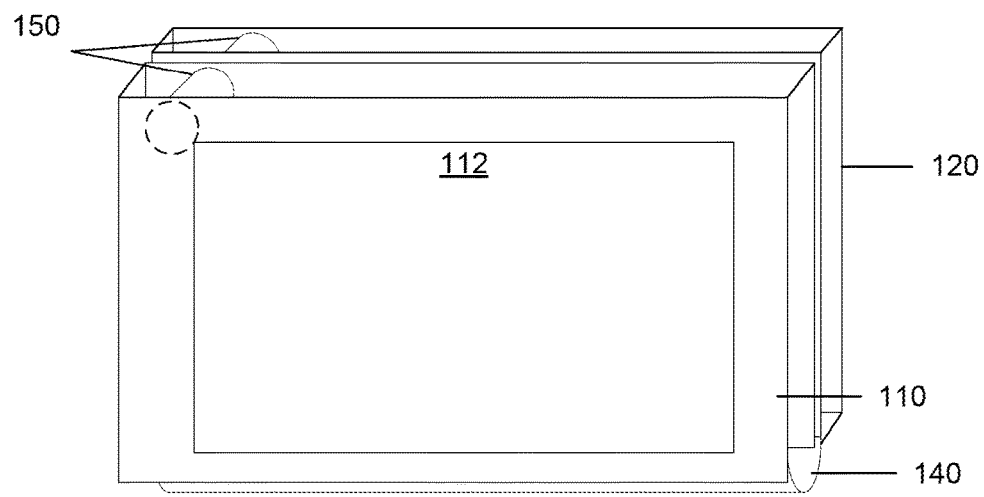
FIG. 2B is a front-view block diagram depicting a monitor side of the example convertible electronic device in the tablet mode according to the improvement.

FIG. 2B is a frontal view of a monitor side of the example convertible electronic device 100 in the tablet mode depicted in a side view in FIG. 1B when the device is in the tablet mode. The combined camera 150 is depicted as an effective rear-facing camera as one might expect in a tablet.

Figure 2C:
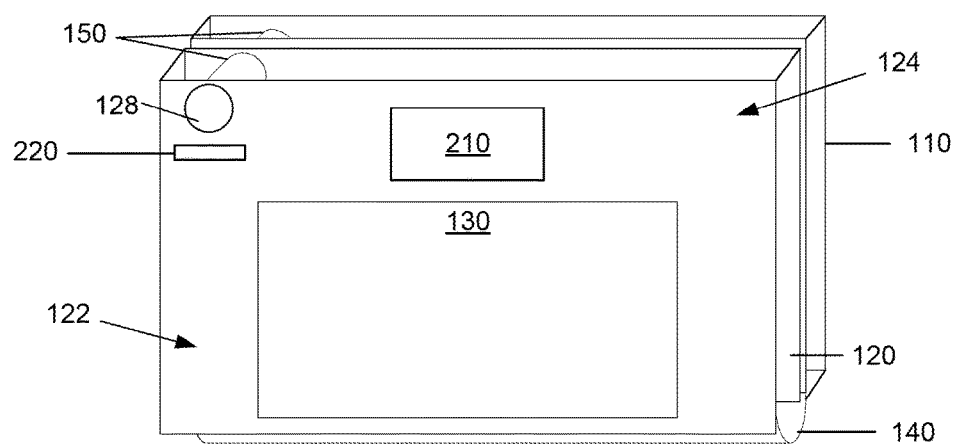
FIG. 2C is a front-view block diagram depicting a keyboard side of the example convertible electronic device in the tablet mode according to the improvement.

FIG. 2C is a frontal view of a keyboard side of the example convertible electronic device 100 depicted in a side view in FIG. 1B when the device is in the tablet mode. Here, one can see the orientation of the front surface of the keyboard base 120 relative to the monitor as shown in FIG. 2B: when the hinge 140 is on the bottom, the combined camera 150 is on top, near the touchpad 210. Also, the external surface 128 of the combined camera 150 is above the manual control 220. Nevertheless, it is understood that the convertible electronic device 100 may be used in any orientation when in the tablet mode.

Figure 3:
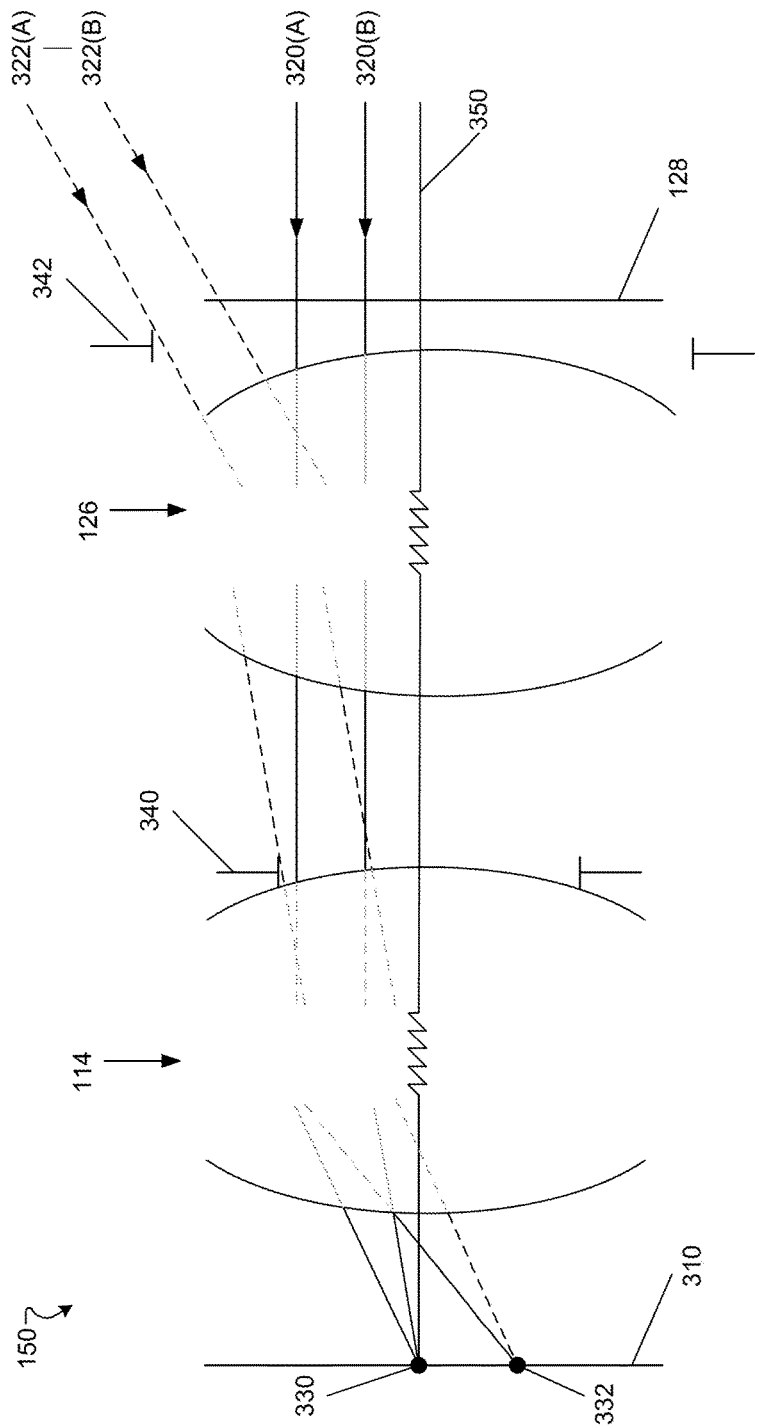
FIG. 3 is a diagram depicting an example camera and transparent optical system forming a combined camera according to the improvement.

FIG. 3 is schematic lens diagram of an example rear-facing camera 114 and an example transparent optical system 126 forming a combined camera 150. Each of the rear-facing camera 114 and the transparent optical system 126 is depicted as a respective generic black-box optical system having a front surface and a rear surface. However, it is understood that each of the rear-facing camera 114 and the transparent optical system 126 can be a complex optical system and may include many optical surfaces. For example, the rear-facing camera 114 can include between five and eight surfaces, some of which have aspheric profiles.

As depicted in FIG. 3, the transparent optical system 126 can be afocal, i.e., can map parallel light rays to parallel light rays. Parallel light rays correspond to points on an object at infinity. This mapping is depicted in FIG. 3 through parallel pairs of incident rays 320(A) and 320(B) (solid) and parallel pairs of incident rays 322(A) and 322(B) (dashed). However, it is understood that this afocal transparent optical system 126 is but one example of many possible such optical systems that may be used in the convertible computer system 100.

The external surface 128 of the transparent optical system 126 is shown in FIG. 3 in front of the first surface of the transparent optical system 126. It is understood that the external surface 128 itself has no optical power and does not change the direction of the incoming rays 320(A), 320(B), 322(A), and 322(B).

As depicted in FIG. 3, the afocal transparent optical system 126 provides an increased light-gathering capability for the combined camera 150 over the rear-facing camera 114 alone. The rays 320(A) and 320(B) are incident parallel to an axis of symmetry 350 of the combined camera 150 and emerge parallel to the axis 350. The rays 322(A) and 322(B) are incident at an angle with respect to the axis 350 and emerge at a smaller angle with respect to the axis 350. In this way, the transparent optical system has increased the range of angles that the combined camera 150 accepts when compared to the range of angles that the rear-facing camera 114 accepts alone. Increasing the range of acceptance angles decreases the f-number. For example, if the rear-facing camera 114 has an f-number of 2.4, then the f-number of the combined camera 150 is less than 2.4, e.g., 1.8.

The respective ranges of angles of the combined camera 150 and the rear-facing camera 114 are determined by the diameter of the respective clear apertures 342 and 340. As depicted in FIG. 3, these clear apertures are physical stops at the front surfaces. The clear aperture 342 is larger than the clear aperture 340. However, because the transparent optical system 126 maps ray angles to smaller ray angles, the rear-facing camera 114 functions as if it were alone, albeit with an increased amount of light.

The combined camera 150 also includes an image detector 310 on which image points 330 and 332 are formed by the combined camera 150. The image detector 310 can include a charged-coupled device (CCD) array, although in some arrangements it may include other electronics such as a thin-film transistor (TFT).

Figure 4:
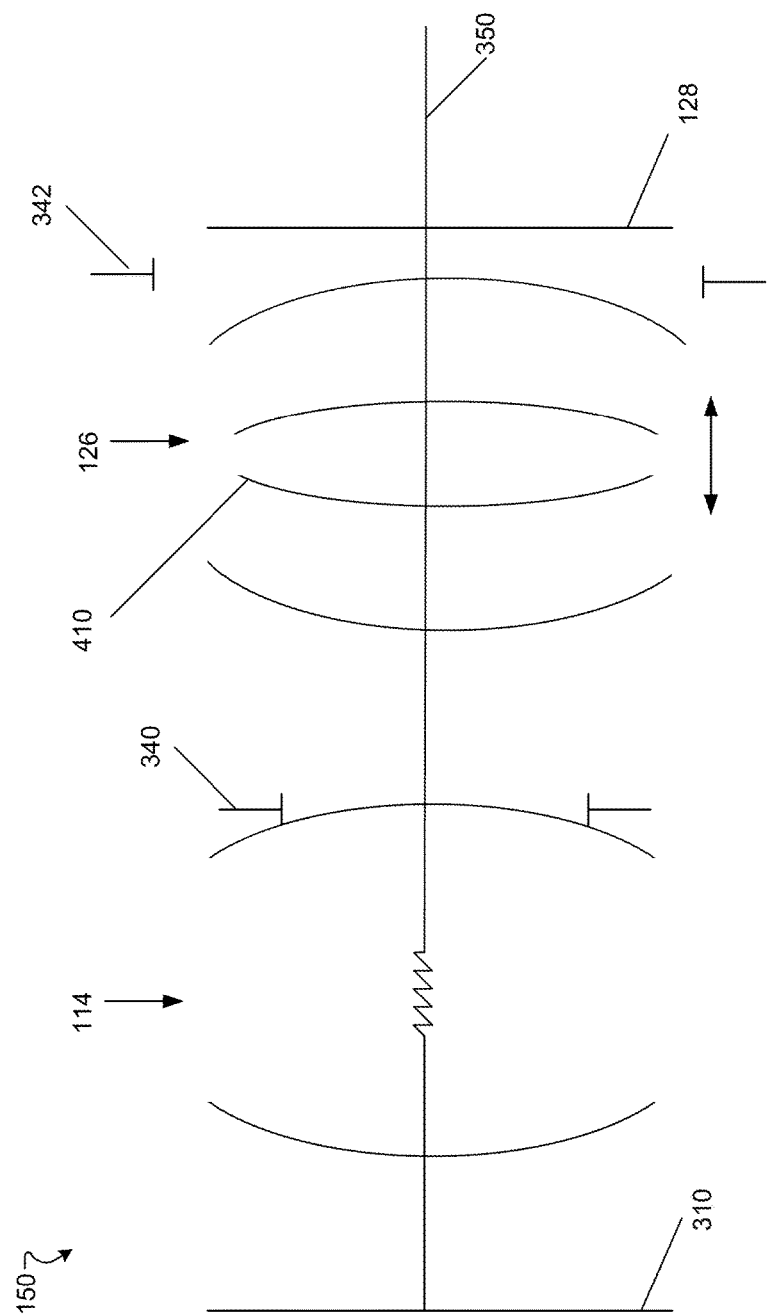
FIG. 4 is a diagram depicting another example camera and transparent optical system forming a combined camera according to the improvement.

FIG. 4 is a schematic diagram depicting another example camera 114 and transparent optical system 126 forming the combined camera 150. In this case, the transparent optical system 126 has a finite focal length and includes a zoom lens 410. The zoom lens 410 is configured and arranged to move along the axis 350 according to a control operated by a user. An effect of a movement of the zoom lens 410 along the axis 350 is to change an effective focal length of the combined lens 150. Changing the effective focal length of the combined camera 150 may affect the light-gathering and imaging capabilities of the combined camera 150. For example, increasing the focal length may increase the f-number and in this case the combined camera 150 acts as a telephoto lens.

Figure 5A:
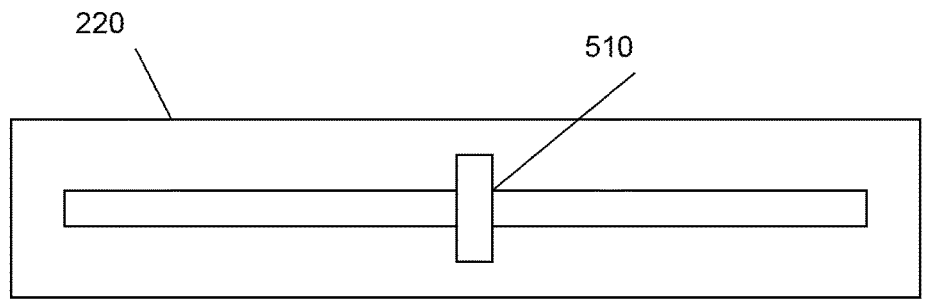
FIG. 5A is a diagram depicting an example manual control of a transparent optical system according to the improvement.

FIG. 5A is a diagram depicting an example manual control 220 of the combined camera 150. The manual control 220 may be used to move a zoom lens, for example. Here, the manual control 220 takes the form of a slide bar 510. In some arrangements, the slide bar 510 may be arranged so the manual control is substantially flat against the surface of the keyboard base 120 so as to not interfere with the comfort of the user.

Figure 5B:
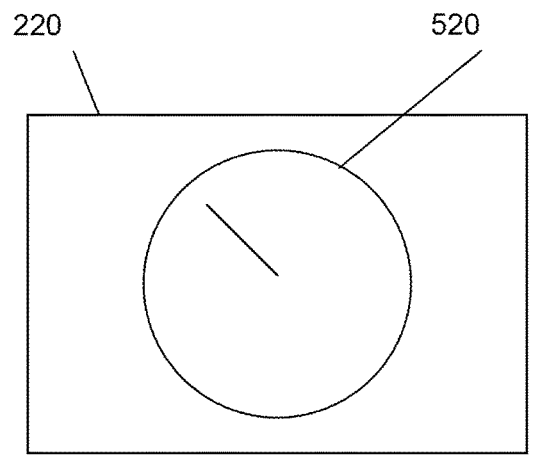
FIG. 5B is a diagram depicting another example manual control of a transparent optical system according to the improvement.

FIG. 5B is a diagram depicting another example manual control 220 of the combined camera 150. Here, the manual control 220 takes the form of a dial 520. In some arrangements, the dial 520 may be arranged so the manual control is substantially flat against the surface of the keyboard base 120 so as to not interfere with the comfort of the user.

Figure 5C:
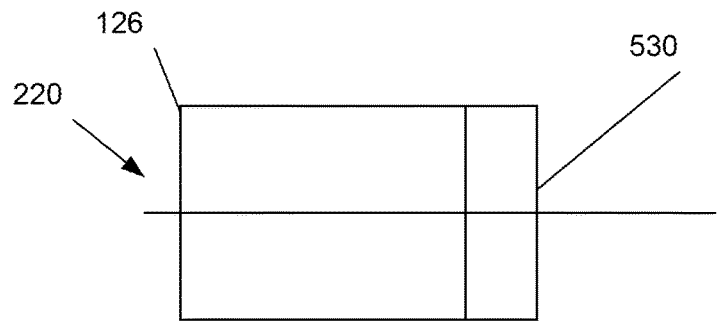
FIG. 5C is a diagram depicting another example manual control of a transparent optical system according to the improvement.

FIG. 5C is a diagram depicting another example manual control 220 of the combined camera 150. Here, the manual control 220 takes the form of a twisting member 530 on top of the transparent optical system 126. To make a manual adjustment, a user would rotate the twisting member 530 about the axis of symmetry of the transparent optical system 126. In this case, the twisting member 530 may protrude some from the surface of the keyboard base 120.

Figure 6:
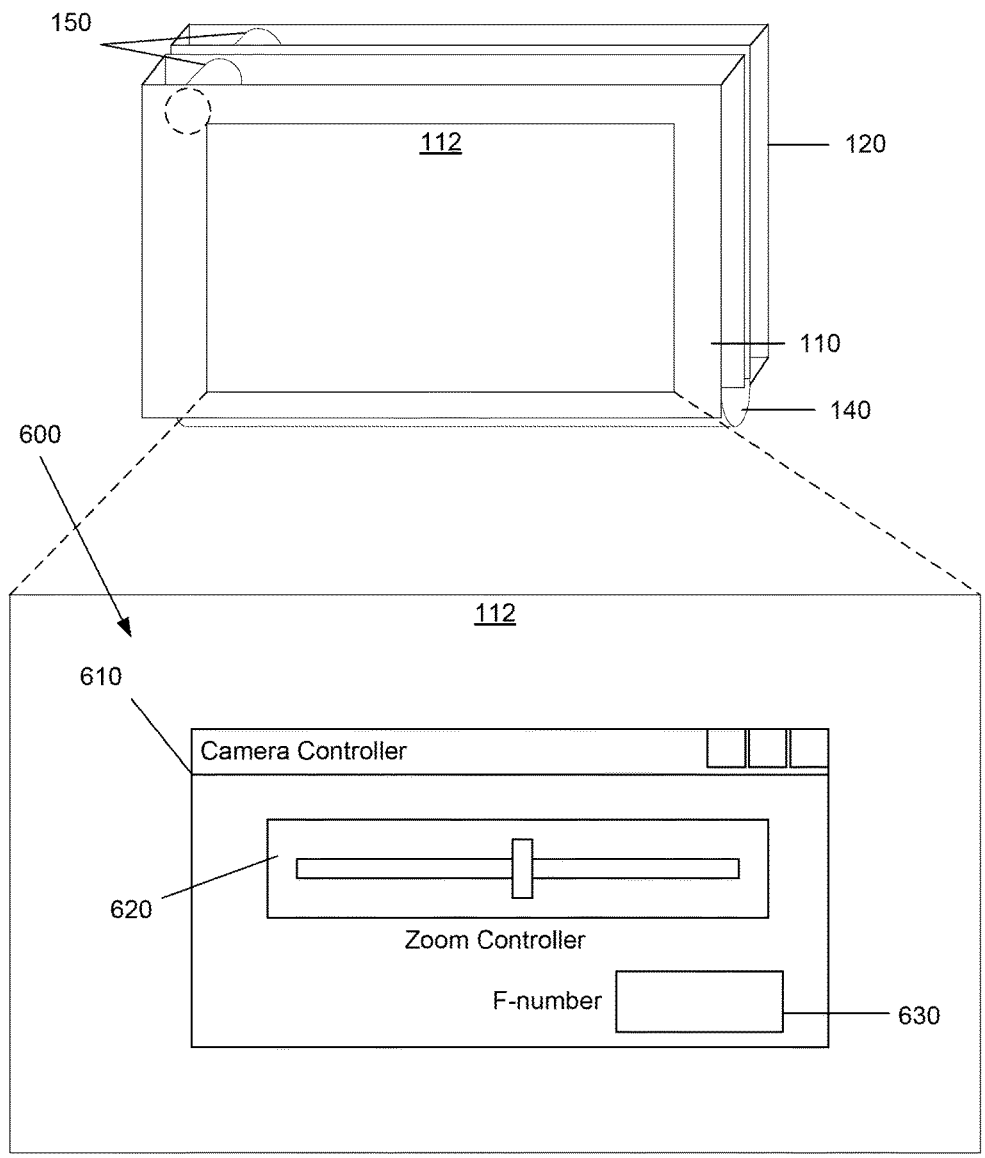
FIG. 6 is a diagram depicting an example electronic control of a transparent optical system according to the improvement.

FIG. 6 is a diagram depicting another embodiment of the improved technique that involves the use of an example electronic control 600 of the combined camera 150. This example electronic control 600 takes the form of hardware and/or software included in the convertible computer system 100. The electronic control 600 is then configured and arranged to take input from a user via the display 112 of the convertible computer system 100.

Within the display 112, the electronic control 600 takes the form of a GUI window 610 depicted in FIG. 6 as a window entitled "Camera Controller." As depicted in FIG. 6, the GUI window 610 includes a slide bar 620 and a text box 630. Here, the slide bar 620 is configured and arranged to accept user input that specifies a position of the zoom lens of the transparent optical system 126 as depicted in FIG. 4. The text box 630 is configured and arranged to accept user input that specifies an f-number of the combined camera 150.

Figure 7:
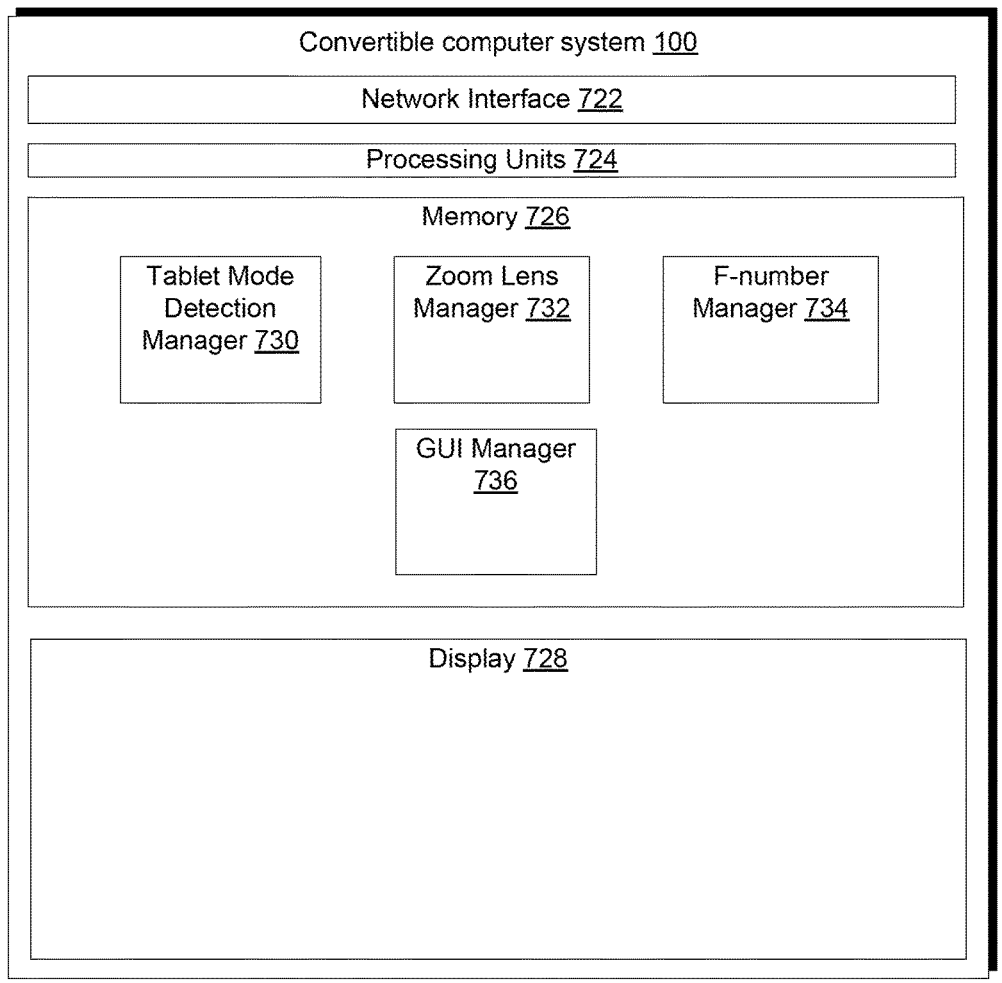
FIG. 7 is a diagram depicting an example convertible electronic device that provides electronic control of a transparent optical system according to the improvement.

FIG. 7 is a diagram depicting an example convertible computer system 100 that provides the electronic control 600 of the combined camera 150. As depicted in FIG. 7, the convertible computer system 100 includes processing units 724, memory 726, and a display 728.

In some implementations, the convertible computer system 100 can be configured to operate based on one or more platforms (e.g., one or more similar or different platforms) that can include one or more types of hardware, software, firmware, operating systems, runtime libraries, and/or so forth.

The set of processing units 724 include one or more processing chips and/or assemblies. The memory 726 includes both volatile memory (e.g., RAM) and non-volatile memory, such as one or more ROMs, disk drives, solid state drives, and the like. The set of processing units 724 and the memory 726 together form control circuitry, which is configured and arranged to carry out various methods and functions as described herein.

The components (e.g., modules, processing units 724) of the convertible computer system 100 can be configured to operate based on one or more platforms (e.g., one or more similar or different platforms) that can include one or more types of hardware, software, firmware, operating systems, runtime libraries, and/or so forth.

The components of the convertible computer system 100 can be, or can include, any type of hardware and/or software configured to capture images. In some implementations, one or more portions of the components shown in the components of the convertible computer system 100 in FIG. 7 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the convertible computer system 100 can be, or can include, a software module configured for execution by at least one processor (not shown). In some implementations, the functionality of the components can be included in different modules and/or different components than those shown in FIG. 7.

In some implementations, the memory 726 can be any type of memory such as a random-access memory, a disk drive memory, flash memory, and/or so forth. In some implementations, the memory 726 can be implemented as more than one memory component (e.g., more than one RAM component or disk drive memory) associated with the components of the convertible computer system 100.

In some embodiments, one or more of the components of the convertible computer system 100 can be, or can include, processors configured to process instructions stored in a memory. For example, a tablet mode detection manager 730 (and/or a portion thereof), a zoom lens manager 732, an f-number manager 734, and/or an GUI manager 736 (and/or a portion thereof) can be a combination of a processor and a memory configured to execute instructions related to a process to implement one or more functions.

The tablet mode detection manager 730 is configured to detect when the convertible computer system 100 switches from the laptop mode to the tablet mode, e.g., when an angle between the display 112 and the keyboard 130 is greater than 180 degrees. The tablet mode detection manager 730 is also configured to deactivate the keyboard 130 and activate the automatic control 600 upon a switch to the tablet mode from the laptop mode. The automatic control 600

The zoom lens manager 732 is configured to accept input from the automatic control 600 and translate that input into an electrical signal directed ti, e.g., an actuator or servo (not shown) that controls the position of the zoom lens 410 within the transparent optical system 126.

The f-number manager 734 is configured to accept input from the automatic control 600 and translate that input into an electrical signal directed to, e.g., an actuator or servo (not shown) that controls the clear diameter 342 within the transparent optical system 126.

The GUI manager 736 is configured to generate and display the GUI window 610 on the display 112.

Figure 8:
FIG. 8 is a flow chart depicting an example method of operating a convertible electronic device according to the improvement.

FIG. 8 is a flow chart depicting an example method 800 of operating the convertible electronic device 100. The method 800 may be performed by the sets of instructions described in connection with FIG. 7, which reside in memory 726 of the convertible electronic device 100 and are run by the set of processing units 724.

At 802, a base of a laptop is positioned with respect to a monitor of the laptop to transition the convertible electronic device 100 from a laptop mode to a tablet mode. The monitor of the laptop includes a rear-facing camera and the base includes a transparent optical system aligned with the rear-facing camera.

At 804, a second camera is formed from the rear-facing camera and the transparent optical system once the laptop is in tablet mode.

Figure 9:
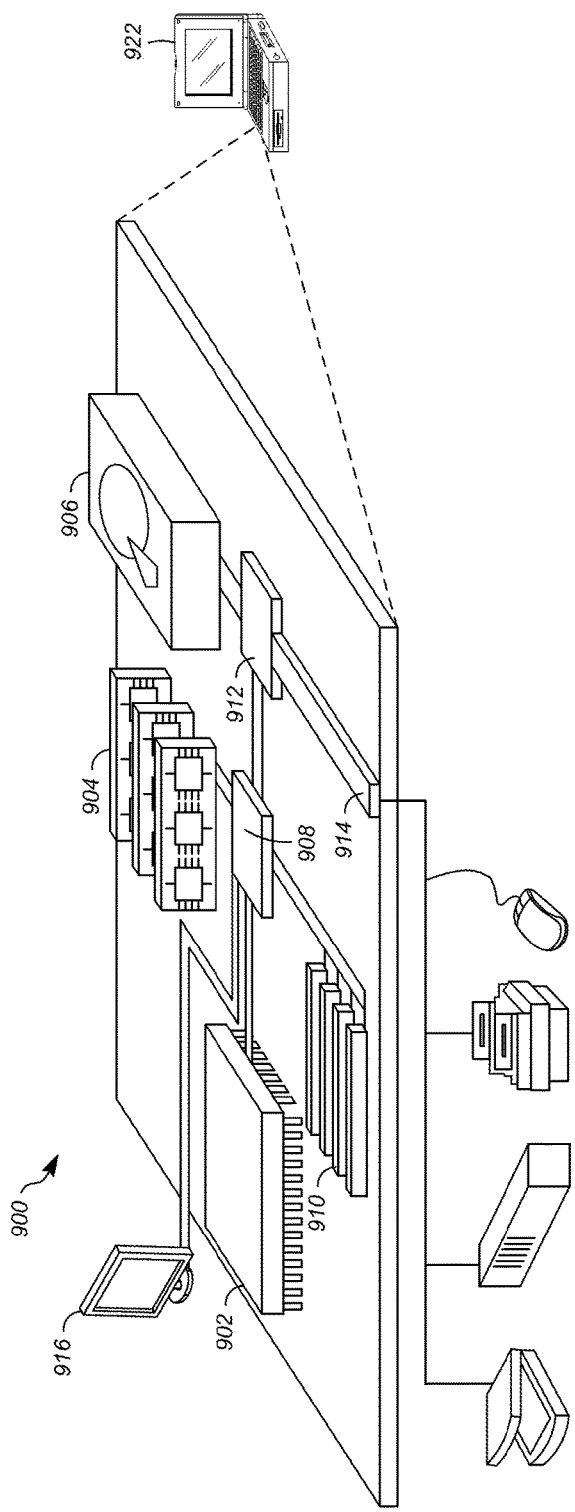
FIG. 9 is a diagram depicting an example of a computer device that can be used to implement the improvement described herein.

FIG. 9 shows an example of a generic computer device 900, which may be used with the techniques described here. Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. In addition, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented as a laptop computer 822. Alternatively, components from computing device 800 may be combined with other components in a mobile device (not shown). Each of such devices may contain one or more of computing device 900, and an entire system may be made up of multiple computing devices 900 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a TFT (thin film transistor) or LCD (liquid crystal display) monitor) for displaying information to the user and a keyboard and a pointing device (e.g., a mouse or a touchpad) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A convertible computer system comprising:
   a monitor;
   a base; and
   a hinge element arranged to pivotably position the base about the hinge element with respect to the monitor;
   the monitor including (i) a first side having a display and (ii) a second side facing opposite the first side, the second side having a first camera;
   the base including (i) a physical keyboard and (ii) a base area adjacent to the keyboard;
   the system being configured to be operated in one of a laptop mode and a tablet mode according to, respectively, whether the base faces the first side of the monitor or the base faces the second side of the monitor; and
   the base further including a transparent optical system having a set of optical surfaces including an external surface positioned within the base area and being aligned with the first camera when the system is in tablet mode, the camera and the transparent optical system as aligned in tablet mode together forming a second camera.

2. The system as in claim 1, wherein the transparent optical system includes an afocal optical system.

3. The system as in claim 1, wherein the first camera has a first f-number, and
   wherein the second camera has a second f-number, the second f-number being less than the first f-number.

4. The system as in claim 1, wherein the first camera includes a fixed-focus lens system configured to produce images at a first focal length over a first depth of focus, and wherein the second camera is configured to produce images at a second focal length over a second depth of focus, the second depth of focus being greater than the first depth of focus.

5. The system as in claim 1, wherein the first camera includes a fixed-focus lens system configured to produce images at a first focal length, and
   wherein the second camera includes a zoom lens system configured to produce images over a range of focal lengths, the range of focal lengths including the first focal length.

6. The system as in claim 1, further comprising a manual control in the vicinity of the transparent optical system in the base area, the manual control constructed and arranged to adjust imaging properties of the second camera.

7. The system as in claim 6, wherein the transparent optical system has an axis of symmetry that is orthogonal to the first side of the base, and
   wherein the manual control includes a twist element attached to the external surface of the transparent optical system, the twist element effecting an adjustment of the imaging properties of the second camera when the twist element is rotated about the axis of symmetry of the transparent optical system.

8. The system as in claim 6, wherein the manual control includes a slide element set in the first side of the base, the slide element effecting an adjustment of the imaging properties of the second camera when the slide element is translated from a first position relative to the base to a second position relative to the base.

9. The system as in claim 6, wherein the manual control includes a dial element set in the base, the dial element effecting an adjustment of the imaging properties of the second camera when the dial element is rotated from a first position relative to the base to a second position relative to the base.

10. The system as in claim 6, wherein the manual control is constructed and arranged to change an effective focal length of the second camera.

11. The system as in claim 1, further comprising an electronic control configured and arranged to adjust imaging properties of the second camera, the electronic control being arranged to accept input from a graphical user interface (GUI) displayed on the display of the monitor, the input being used by the electronic control to effect adjustments to the imaging properties of the second camera.

12. The system as in claim 11, wherein the electronic control includes an activation element that is configured and arranged to (i) detect whether the system is in the laptop mode or in the tablet mode and (ii) automatically display the GUI on the display in response to the activation element detecting that the system is in the tablet mode.

13. The system as in claim 11, wherein the electronic control is configured and arranged to change an effective focal length of the second camera.

14. The method as in claim 11, wherein the electronic control includes an activation element that is configured and arranged to (i) detect whether the system is in the laptop mode or in the tablet mode and (ii) in response to the activation element detecting that the system is in the tablet mode, the display of the monitor is configured as a touchscreen that accepts touch commands, the electronic control configured to accept input from the GUI is further configured to accept input from a touch command on the GUI displayed on the display of the monitor.

15. A computer program product comprising a non-transitory, computer-readable storage medium which stores instructions that, when executed by a controller of a computer system, cause the controller to carry out a method, the computer system having a monitor, a base, and a hinge element arranged to pivotably position the base with respect to the monitor, the monitor including (i) a first side having a display and (ii) a second side facing opposite the first side, the second side having a first camera, the base including a keyboard and a base area adjacent to the keyboard, the method comprising:

receiving an indication that the computer system has transitioned from a laptop mode to a tablet mode, the computer system being in one of the laptop mode and the tablet mode according to, respectively, whether the base faces the first side of the monitor or the base faces the second side of the monitor;

in response to receiving the indication, (i) forming a second camera from the first camera and a transparent optical system, the transparent optical system having a set of optical surfaces including an external surface positioned within the base area of the base and being aligned with the first camera when the system is in tablet mode and (ii) displaying a graphical user interface (GUI) on the display of the monitor, the GUI being configured to accept input from a user;

receiving input from the user via the GUI; and in response to receiving the input via the GUI, adjusting imaging properties of the second camera.

16. The computer program product as in claim 15, wherein adjusting the imaging properties of the second camera includes changing an effective focal length of the second camera.

17. The computer program product as in claim 15, wherein the first camera has a first f-number, and
wherein the second camera has a second f-number, the second numerical aperture being less than the first f-number.

18. The computer program product as in claim 15, wherein the first camera includes a fixed-focus lens system producing images at a first focal length over a first depth of focus, and
wherein the second camera produces images at a second focal length over a second depth of focus, the second depth of focus being greater than the first depth of focus.

19. The computer program product as in claim 15, wherein the first camera includes a fixed-focus lens system producing images at a first focal length, and
wherein the second camera includes a zoom lens system producing images over a range of focal lengths, the range of focal lengths including the first focal length.

20. In a computer system having a monitor, a base, and a hinge element arranged to pivotably position the base with respect to the monitor, the monitor including (i) a first side having a display and (ii) a second side facing opposite the first side, the second side having a first camera, the base including a keyboard and a base area adjacent to the keyboard, a method comprising:

while the computer system is in a laptop mode, positioning the base using the hinge to transition the computer system to a tablet mode, the computer system being in one of the laptop mode and the tablet mode according to, respectively, whether the base faces the first side of the monitor or the base faces the second side of the monitor; and after transitioning the computer system to the tablet mode, forming a second camera from the first camera and a transparent optical system, the transparent optical system having a set of optical surfaces including an external surface positioned within the base area of the base and being aligned with the first camera when the system is in tablet mode.

21. The method as in claim 20, further comprising adjusting imaging properties of the second camera using a manual control.

* * * * *

UNITED STATES PATENT AND TRADEMARK OFFICE
CERTIFICATE OF CORRECTION

PATENT NO.       : 9,942,466 B2
APPLICATION NO.  : 15/193803
DATED            : April 10, 2018
INVENTOR(S)      : Martin Perez et al.

It is certified that error appears in the above-identified patent and that said Letters Patent is hereby corrected as shown below:

On the Title Page

Column 1, Item (72), in "Inventors", Line 1, delete "Alos" and insert -- Los --, therefor.

In the Claims

In Column 9, Line 41, Claim 1, delete "monitor;" and insert -- monitor, --, therefor.

In Column 10, Line 56, Claim 14, delete "method" and insert -- system --, therefor.

In Column 12, Line 35, Claim 21, delete "method" and insert -- computer system --, therefor.

Signed and Sealed this
Eleventh Day of December, 2018

Andrei Iancu
*Director of the United States Patent and Trademark Office*